(12) United States Patent
Anderson

(10) Patent No.: US 10,250,522 B1
(45) Date of Patent: Apr. 2, 2019

(54) SECURE DISTRIBUTED COMPUTING USING CONTAINERS

(71) Applicant: Neil Anderson, Shawnee, KS (US)

(72) Inventor: Neil Anderson, Shawnee, KS (US)

(*) Notice: Subject to any disclaimer, the term of this patent is extended or adjusted under 35 U.S.C. 154(b) by 0 days.

(21) Appl. No.: 15/710,675

(22) Filed: Sep. 20, 2017

Related U.S. Application Data

(62) Division of application No. 14/530,548, filed on Oct. 31, 2014, now Pat. No. 9,800,517.

(60) Provisional application No. 61/898,275, filed on Oct. 31, 2013.

(51) Int. Cl.
| | |
|---|---|
| *H04L 9/32* | (2006.01) |
| *H04L 12/911* | (2013.01) |
| *H04L 9/00* | (2006.01) |
| *H04L 29/08* | (2006.01) |

(52) U.S. Cl.
CPC ............ *H04L 47/70* (2013.01); *H04L 9/008* (2013.01); *H04L 67/10* (2013.01); *H04L 2209/24* (2013.01)

(58) Field of Classification Search
CPC .......... H04L 47/70; H04L 9/008; H04L 67/10
USPC ............................................. 713/168; 380/28
See application file for complete search history.

(56) References Cited

U.S. PATENT DOCUMENTS

| | | | | |
|---|---|---|---|---|
| 2006/0126843 | A1* | 6/2006 | Brickell | H04L 9/0637 380/260 |
| 2007/0140479 | A1* | 6/2007 | Wang | H04L 9/008 380/30 |
| 2008/0273693 | A1* | 11/2008 | Au | H03M 7/40 380/28 |
| 2012/0066510 | A1* | 3/2012 | Weinman | H04L 9/008 713/189 |
| 2014/0164251 | A1* | 6/2014 | Loh | G06Q 20/065 705/67 |
| 2014/0177828 | A1* | 6/2014 | Loftus | H04L 9/008 380/44 |

* cited by examiner

*Primary Examiner* — Jeffrey C Pwu
*Assistant Examiner* — Samuel Ambaye
(74) *Attorney, Agent, or Firm* — Hovey Williams LLP

(57) ABSTRACT

A system for performing distributed computing. The system comprises a plurality of compute node resources for performing computations for the distributed computing, a management resource for managing each of the compute node resources in the plurality, and a virtual cloud network. The management resource and the plurality of compute node resources are interconnected via the virtual cloud network.

22 Claims, 8 Drawing Sheets

SECURE DISTRIBUTED COMPUTING USING CONTAINERS

CROSS-REFERENCE TO RELATED APPLICATIONS

This non-provisional patent application is a divisional patent application of, and claims priority to, co-pending U.S. patent application Ser. No. 14/530,548, filed Oct. 31, 2014, and entitled "SECURE DISTRIBUTED COMPUTING USING CONTAINERS," which claims priority to U.S. Provisional Patent Application Ser. No. 61/898,275, filed Oct. 31, 2013, and entitled "SYSTEM POOLS FOR LIMITLESS SECURE NODE CONTAINER ASSOCIATION AND PROCESS DISTRIBUTION," with the entire disclosures of the above-identifiedpatent application and the provisional patent application being incorporated herein by reference.

BACKGROUND

1. Field of the Invention

The present invention relates generally to distributed computing. In more detail, embodiments of the present invention are directed to a system, a method, and a computer program for facilitating secure distributed computing via a plurality of compute nodes interconnected over a virtual cloud network.

2. Description of the Prior Art

It has previously been contemplated to use a distributed computing network to allow computing devices interconnected over the network to perform computing tasks that would not be generally feasible with individual computing devices. With the combined computing power of the interconnected computing devices, complex and time-consuming computing tasks can be performed quite efficiently. Furthermore, if properly configured, the computing devices of the network can perform such computing tasks using resources that would otherwise remain unused. For example, during the lifetime of many computing devices, much of the computing devices processing and memory capacity remains idle, and thus, wasted.

Nevertheless, even given the benefits of distributed computing mentioned above, such benefits have, until now, remained out of reach because for several reasons. First, previously-contemplated distributed computing methods have failed to incorporate systems that allow computing devices of differing types (e.g., different underlying hardware and software) and/or computing devices being connected on differing networks to be interconnected for purposes of performing distributed computing. For example, until now, it has been difficult to facilitate computing devices that run different types of operating systems to work together to perform distributed computing. Additionally, until now, previous distributed computing methods have failed to provide adequate protection and security for the distributed computing tasks being performed and for the data on which such distributed computing is being performed.

Accordingly, there remains a need for a system, a method, and a computer program for facilitating distributed computing via a plurality of compute node resources interconnected over a virtual cloud network, with such system, method, and computer program facilitating distributed computing by networks of computing devices of generally any type and in an entirely secure manner.

SUMMARY OF THE INVENTION

Embodiments of the present invention include a system for performing distributed computing. The system comprises a plurality of compute node resources each comprising application containers for performing computations for the distributed computing, a management resource for managing each of the compute node resources in the plurality, and a virtual cloud network. The management resource and the plurality of compute node resources are interconnected via the virtual cloud network.

In another embodiment of the present invention, there is provided a system for performing distributed computing. The system comprises a plurality of compute node resources for performing computations for the distributed computing. The compute node resources are each embodied as one or more application containers executed by a computing device. The system further comprises a management resource for managing each of the compute node resources in the plurality, wherein the management resource comprises a container registry containing a plurality of application containers. The system further comprises a virtual cloud network, with the management resource and the plurality of compute node resources being interconnected via the virtual cloud network.

In still other embodiments of the present invention, there is provided a method for performing secure distributed computing. The method includes the initial step of encrypting a data set using a homomorphic encryption algorithm. A next step includes providing the encrypted data set to the one or more compute node resources. A next step includes providing application containers to one or more compute node resources, with the application containers being configured to process the encrypted data set to obtain a processed encrypted data set. A next step includes receiving the processed encrypted data set from the one or more compute node resources. A final step includes decrypting the processed encrypted data set to obtain a decrypted processed data set.

DETAILED DESCRIPTION OF THE PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

System

Figure 1:
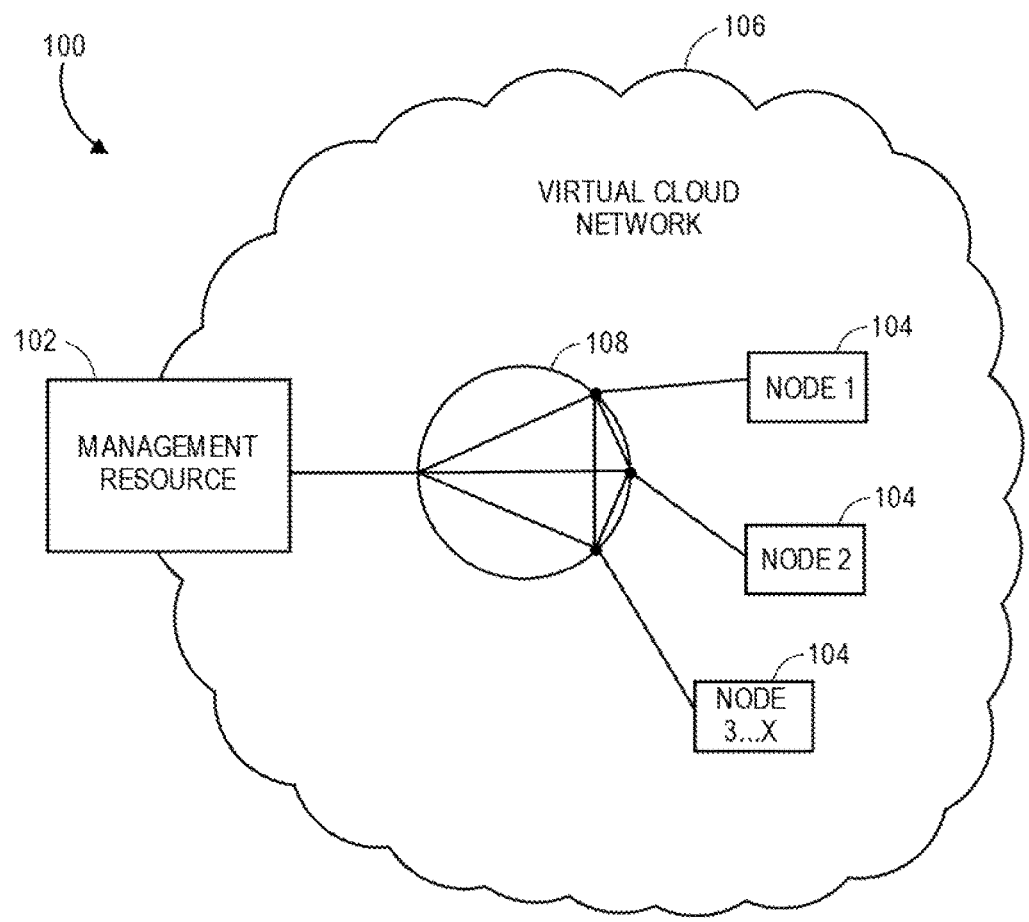
FIG. 1 is a schematic depiction of a system for distributed computing according to embodiments of the present invention, with the system illustrating a management resource and a plurality of compute node resources connected via a virtual cloud network.

Embodiments of the present invention are directed to a system, a computer program, and a method for performing distributed computing. As used herein, distributed computing refers to the use of one or more computing resources to perform any type of computational application. Examples of such applications may include data processing (e.g., big-data processing), cloud computing, peer-to-peer networking, content distribution network, resource-scavenging, web-crawling, distributed databases, and the like. With reference to FIG. 1, a system 100 configured according to embodiments of the present invention is illustrated. The system 100 comprises a management resource 102 and a plurality of compute node resources 104 all interconnected on a virtual cloud network 106. As such, the system 100 facilitates distributed computing by providing for the management resource 102 to (1) manage the virtual cloud network 106, and (2) provision, distribute, and manage computing applications provided for execution via the compute node resources 104.

In more detail, the management resource 102 may comprise one or more electronic resources configured to provide various services that facilitate operation of the system 100. The electronic resources may be in the form of one or more computer programs executable from and/or hosted on one or more computing devices. As used herein, computer programs include what are generally known as instructions, commands, software code, executables, applications ("apps"), and the like. In certain embodiments, the master node resource 102, or portions thereof, may be implemented as one or more container applications, as will be described in more detail below.

The computing devices from which the management resource 102 is hosted may include any device, component, or equipment with one or more processing elements and/or memory elements, such as servers, work stations, desktop computers, laptop computers, palmtop computers, tablet computers, smartphones, or the like. In some embodiments, all of the electronic resources of the management resource 102 may be hosted on a single computing device. However, in other embodiments, the one or more electronic resources of the management resource 102 may each be hosted on separate computing devices that are connected via a network, or networks. Regardless, the processing elements may include processors, coprocessors, microprocessors, microcontrollers, field programmable gate arrays, and the like, or combinations thereof. The memory elements may be capable of storing or retaining the computer program and may also store data, typically binary data, including text, databases, graphics, video, combinations thereof, and the like. The memory elements may also be known as a "computer-readable storage medium" and may include random access memory (RAM), read only memory (ROM), flash drive memory, solid-State drives (SSD), secure digital cards (SD cards), floppy disks, hard disk drives, optical storage medium such as compact discs (CDs or CDROMs), digital video disc (DVD), Blu-Ray, and the like, or combinations thereof. In addition to these memory elements, the computing devices and/or server devices may further include file stores comprising a plurality of hard disk, network attached storage, or a separate storage network.

Similarly, the compute node resources 104 may comprise an electronic resource in the form of one or more computer programs executable from and/or hosted on one or more computing devices. In certain embodiments, the compute node resources 104, or portions thereof, may be implemented as one or more container applications, as will be described in more detail below. The computing devices of the compute node resources 104 may include any device, component, or equipment with one or more processing elements and/or memory elements, such as server devices, work stations, desktop computers, laptop computers, palmtop computers, tablet computers, smartphones, or the like. In other embodiments, the computing devices may comprise various unique computing devices, or other device-enabled equipment, such as wearable technology (e.g., digital wristwatches, Google™ Glass™, or the like), digital video cameras, personal electronic devices (e.g., iPods™, personal digital assistants (PDAs), or the like), smart devices, smart appliances and other appliances (e.g., refrigerators, stoves, dishwashers, washers/dryers, or the like), satellites, spacecraft, motorcycles, automobiles, helicopters, airplanes, rockets, missiles and other weapons, submarines, unmanned aerial vehicles (UAVs) (i.e., aerial drones), security cameras, video gaming consoles (e.g., PlayStation™, Nintendo™, X-Box™, Game Boy™), computer graphical displays, televisions, video projectors, media and entertainment units (e.g., digital video disc (DVD), Blu-Ray™, bitcoin-miner devices, digital video recorder (DVR), cable boxes, or the like), stereo tuners, audio speakers, ceiling fans, smart meters (and other advanced metering infrastructure (AMI)), smart sensors, medical equipment, personal implants, emergency monitoring systems devices, home automation systems devices, smart traffic control systems devices, smart cities devices, electronic toll collection systems devices, logistic and fleet management systems devices, lamps and other lighting displays, thermostats, furnaces, hot water heaters, fiber to the premises (FTTP) modems/routers/switches, cable modems/routers/switches, digital subscriber line (DSL) modems/routers/switches, or any form of network device including but not limited to routers, switches, and modems, and the like. As may be apparent, certain of the computing devices listed above (e.g., laptops, smarthphones, etc.) may generally be considered personal computing devices, as such computing devices are generally owned and/or operated by individuals. Alternatively, certain of the computing devices listed above (e.g., FTTP modems/routers/switches, or other devices) may generally be considered managed computing devices, as such computing devices may generally be owned and/or operated by businesses for use by individuals. In some embodiments, businesses may give the device to the individual for free, or otherwise subsidized for ownership. Regardless, the processing elements associated with the above-described computing devices may include processors, coprocessors, microprocessors, microcontrollers, field programmable gate arrays, application-specific integrated circuits (ASIC) and/or system-on-a-chip (SoC), and the like, or combinations thereof. In certain preferred embodiments, certain processing functions may be performed by graphics processing units (GPUs), or application-specific integrated circuits ASICs, which may provide for specialized processing capabilities, as will be described in more detail below. The memory elements may be capable of storing or retaining the computer program and may also store data, typically binary data, including text, databases, graphics, video, combinations thereof, and the like. The memory elements may also be known as a "computer-readable storage medium" and may include RAM, ROM, flash drive memory, floppy disks, solid state drives, hard disk drives, optical storage medium such as CDs or CDROMs, DVDs, Blu-Ray, and the like, or combinations thereof. In addition to these memory elements, the computing devices may further include file stores comprising a plurality of hard disk, network attached storage, a separate storage network, and other file store types.

The management resource 102 and the plurality of compute node resources 104 of the system 100 are connected via the virtual cloud network 106, which is a virtual network layered over a physical network infrastructure. In certain embodiments, the virtual cloud network 106 may be a virtual network layered over one or more additional virtual networks. Such other virtual networks may be layered on still other virtual networks, virtual machines, and/or on physical networks. In certain embodiments, the virtual cloud network 106 (e.g., layer or layers) may be a software-defined network, or networks, the establishment of which will be described in more detail below. The virtual cloud network 106 may comprise a communications network comprising wired or wireless networks, such as local area networks (LANs), metro area networks (MANs), wired local area networks (WLANs), Controller Area Networks (CANs), personal area networks (PANs), global area networks (GANs), storage area networks (SANs), or wide area networks (WANs), as well as the Internet, or cloud networks, and the like. The physical network infrastructure underlying the virtual cloud network may include servers, routers, switches, wireless receivers and transmitters, and the like, as well as electrically conductive cables or optical cables. In some embodiments, the physical network infrastructure may include virtual or partially-virtual components, such as virtualized devices or virtual machines running on physical networks or machines (i.e., bare metal). In certain preferred embodiments, the physical network infrastructure may be implemented on a fiber optic network, or other broadband network, which provides for high bandwidth, low latency data transfer.

In certain embodiments, as illustrated in FIG. 1, the virtual cloud network 106 may be implemented as a network overlay or network overlay mesh 108 that interconnects each of the nodes (i.e., the management resource and the compute node resource) in the system 100. Such a mesh 108 may comprise one or more software defined networks. In some embodiments, the network overlay mesh 108 may be a subset network (e.g., a subnet, virtual LAN, etc.) of the virtual cloud network 106. As an exemplary illustration, if the virtual cloud network 106 connects a management resource and ten compute node resources, a network overlay mesh 108 may connect the management resource and only five of the compute node resources. As such, embodiments provide for the system 100 to comprise network overlay meshes 108, each of which may include any permutation of node subsets in one or more virtual cloud networks 106. Regardless of the arrangement of nodes in the network overlay mesh 108, embodiments of the present invention provide for each of the nodes in the mesh 108 to connect with every other node either directly or indirectly. For one example, in certain embodiments, a first node may be unable to communicate directly with a second node because a direct route between the nodes does not exist, or is not permitted by a given network configuration. Nevertheless, embodiments provide for communication between the first and second (or more) nodes indirectly through one or more intermediary nodes.

In certain embodiments, the virtual cloud network 106, including each of the mesh overlays within, may be implemented as and/or over an encrypted network. In such an encrypted virtual cloud network 106, every connection between nodes may be encrypted via Internet protocol security (IP Sec), and/or by other common encryption technologies, such that the virtual cloud network 106 effectively operates as a secure peer-to-peer (P2P) network. It is possible, however, to configure the system 100 in a client-server configuration using the management resource 102 comprising one or more servers with which the compute node resources 104 interact as clients on the virtual cloud network 106. It is also possible to configure the system 100 in a star-network configuration using the management resource 102 as a hub or switch through which the compute node resources 104 interact on the virtual cloud network 106. It is also possible to implement the virtual cloud network 106 with a hybrid configuration of mesh overlay, star-network, client-server configurations, and other configurations, for instance where some compute node resources 104 may interact with other compute node resources 104 through the management resource 102, while other compute node resources 104 may interact directly with each other.

Given the configuration of the system 100 provided above, embodiments of the present invention provide for distributed computing via an unlimited combination of standardized and/or custom-tailored applications. To enhance such distributed computing, such applications may generally come in the form of software containers (containers). As used herein, containers are defined as self-contained applications (i.e., computer programs) that include all necessary dependencies required for execution and operation. Such dependencies may include binaries, libraries, modules, or other fundamental information, configurations, and identities necessary for execution of the applications. For example, the containers may include their own internally addressable IP addresses and port numbers, such that the containers are externally addressable such as through transmission control protocol (TCP) and the user datagram protocol (UDP) ports. As such, containers differ from standard virtual machines that typically require and include their own operating systems. Instead, the containers can execute and function based on a shared, single instance of an operating system, such as the operating system's kernel. Thus, containers can be deployed, executed, and ran independently on a plurality of independent nodes, including nodes associated with the management resource and the compute node resources. Such containers may be implemented upon current, or yet-to-be-developed common inter-cloud standards which define compatibility with and portability of said containers to other networks, such as cloud networks which are peered with one another so that all containers implemented therein may be implemented upon or transferred between various cloud networks. For instance, the virtual cloud network 106 may be used as a cloud-bursting platform where a public or private cloud may deploy application containers to the virtual cloud network 106 when the private cloud has run out of local public or local private computing resources. Likewise in turn, a public or private cloud network may be used as a cloud-bursting platform where a virtual cloud network 106 may deploy application containers to a public or private cloud network when the virtual cloud network 106 has run out of compute node resources.

Figure 2:
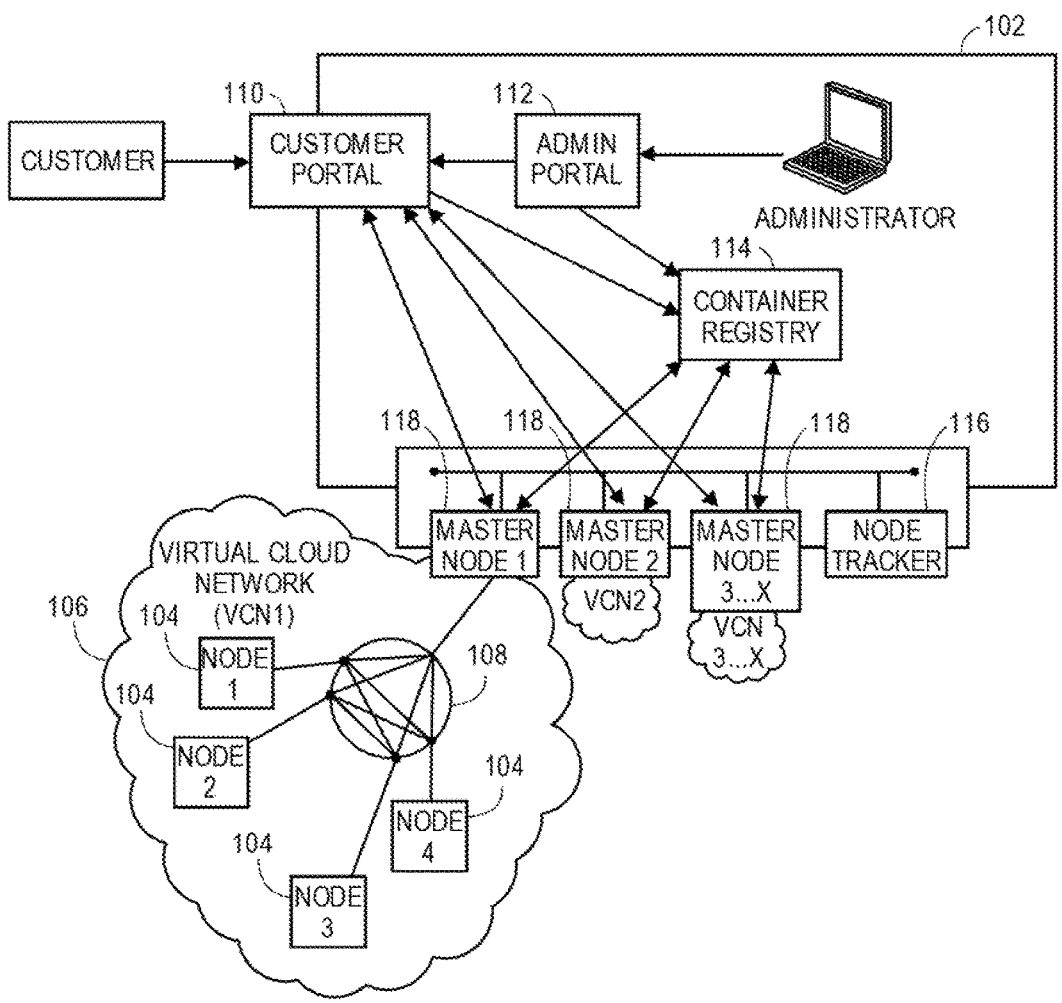
FIG. 2 is an additional schematic depiction of a system for distributed computing according to embodiments of the present invention, with the system particularly illustrating components of a management resource.

Returning to the management resource 102, as illustrated in FIG. 2, the management resource 102 comprises the electronic resource that includes a customer portal 110, an admin portal 112, a container registry 114, and a node tracker 116. In certain embodiments, the management resource 102 will also include one or more master node resources 118 that connect the management resource 102 with the virtual cloud network 106. In certain instances, such as illustrated in FIG. 2, embodiments may provide for a plurality of virtual cloud networks 106 to exist. In such instances, each of the virtual cloud networks 106 would connect with the management resource 102 via an individual master node resource 118. In some embodiments, multiple master node resources 118 may be implemented, either as hot stand-bys for the purpose of high availability fail-over, or for the separation or isolation of individual master node services onto separate master node resources 118. In some embodiments, the master node resources 118 will be provisioned by the management resource 102 on demand, as the need for new or virtual cloud networks 106 arises.

The customer portal 110 provides a customer user with access to the management resource. The customer portal 110 may be presented in the form of a web portal, an application programming interface (i.e., an API), a virtual private network, secure shell (SSH), a file transfer protocol (FTP or SFTP) connection, or the like. Similarly, the admin portal 112 provides access to the management resource 102 by an administrator and may be presented in the form of a web portal, an API, a virtual private network, secure shell (SSH), a file transfer protocol (FTP or SFTP) connection, or the like. The container registry 114 is an electronic resource that includes an associated memory storage location that includes all of the container applications necessary for implementation of embodiments of the present invention. The container registry 114 may be implemented in a containerized fashion, as will be discussed in more detail below. As will also be discussed in more detail below, the container registry 114 may also include a registry interface that allows customer users to create and/or select the appropriate container(s) for use. In some embodiments the registry interface may be accessed or configured from the customer portal 110.

Typically, embodiments of the present invention will include at least four different types of container applications, including virtual switch containers, base containers, general application containers, and accelerated application containers. The virtual switch containers enable the interconnection of nodes (i.e., compute node resources and master node resources) within the virtual cloud network 106 and/or the network overlay meshes 108. As such, the virtual switch containers are configured to implement the network and/or software-defined network functionality which enables the virtual cloud network 106 and/or the network overlay meshes 108. While the virtual switch containers include preset functionalities to efficiently and securely provide common virtual cloud network 106 configurations, it is understood that the virtual switch containers can be remotely modified to implement a plurality of unique network configurations, as may be required.

Base containers comprise a suite of container applications that collectively provide the functionality necessary to implement distributed computing via the virtual cloud network 106. In certain embodiments, the base containers will provide for all features and functionality necessary for the implementation of the system 100 as a platform-as-a-service (PaaS). As used herein, PaaS refers to an application execution environment, such that applications (e.g., containers) can be run on the virtual cloud network 106 without the cost and complexity of buying and managing additional underlying hardware and/or software layers that may otherwise be required. However, the use of existing infrastructure to implement a PaaS or other platform on a virtual cloud network does not preclude the acquisition and provisioning of dedicated, or otherwise shared, hardware and/or software layers, as deemed necessary. It is also possible to implement an infrastructure-as-a-service (IaaS) functionality, which may include physical machines or virtual machines, in addition to the virtual cloud network 106, from which applications can be executed and ran. Certain other embodiments provide for the base containers to offer a hybrid PaaS/IaaS functionality. In certain embodiments, the base containers include separate containers that each together provide the following PaaS functionality: API-controlled PaaS controller, platform state database, platform log server, key value cache and store, platform state store, container creation tool, application container registry 114, application container router, etc. Certain embodiments may include other functionalities necessary to support, modify or interact with said functionalities. Such embodiments may also combine various aspects of said functionalities, or other PaaS functionalities. The API-controlled PaaS controller is the central control mechanism for a PaaS based upon a virtual cloud network 106. It is controlled by an API that allows remote interaction typically via secure shell (SSH) or hypertext transfer protocol secure (HTTPS) protocols. The API-controlled PaaS controller provides base PaaS configurations; authentication, authorization, and accounting (AAA); API call functionality; management of virtual cloud network 106 virtual switch containers; user and group management including secure user authentication; and the like. The platform state database is configured to maintain the state of the PaaS including duplication of the PaaS state data to the platform state store. The platform log server collects log data from all PaaS components, and may be queried by users, or by machine-automated calls. The key value cache and store is used to store logs and cache data which may support various operations of the PaaS. The platform state store is a distributed object store which maintains backups of the platform state database, and other platform state data. The container creation tool pulls the latest code tree, compiles the code, builds the general application and/or base containers, and stores the containers onto the application container registry, for later deployment onto the virtual cloud network 106. The container registry 114 stores containers that may be deployed onto the virtual cloud network 106 for execution.

The application container router directs distribution of containers and/or traffic to containers, as appropriate.

The general application containers contain any application that may be desired to operate on the virtual cloud network. These applications are unlimited in scope, and may consist of any application that may be run upon a conventional computing device and/or network. For example, the general application containers may include the applications that are to be executed via the compute node resources 104 for purposes of performing distributed computing. Tasks involving distributed computing that may be implemented via execution of the general application containers include distributed computing, cluster processing, parallel processing, high-throughput processing, high-performance processing, grid processing, opportunistic processing, Internet-of-things and Internet-of-everything processing networks, smart city architectures including living labs, resource scavenging, cloud computing, monolithic application processing, super-computing, peer-to-peer networking and applications, or the like without limitation. In some embodiments, the container registry 114 will include a plurality of predefined general application containers that provide common computing solutions for the customer user. In other embodiments, the container registry 116 will contain customized general application containers that are created by customer users. As will be described in more detail below, the customer user can create such customized general application containers via interaction with the customer portal 110.

Finally, the accelerated application containers will provide the same functionality as general application containers, but will, furthermore, facilitate accelerated processing to the underlying application. In particular, such accelerated processing may be facilitated by GPUs and/or ASICs included within the computing devices of the compute node resources 104. As such, once a computing device has obtained an accelerated application container, access to the GPU(s) and/or ASICs of the computing devices may be provided to the functionality of the accelerated application container directly from the underlying operating system of the computing device. Furthermore, the accelerated application containers can be created and/or selected by customer users in the same way that the general application containers are created and/or selected, as will be later discussed. In other embodiments, such as when the computing device includes a hypervisor, the functionality of the accelerated application container will be provided access to the computing device's GPU(s) and/or ASICs, as though natively, by utilizing a PCI pass-through or other feature provided by the underlying hypervisor. In other preferred embodiments, other hardware elements may be utilized. For example, rDMA-enabled devices may be utilized to enhance networking performance in order to facilitate direct memory access between two or more networked computing devices, at low latencies. Such direct memory access acceleration (implemented between two or more computing devices) may provide direct remote low-latency access not only to memory, but also to other hardware components such as processor, GPU, disk drive, or the like. Such scenarios result in significantly increased performance and efficiency of the system 100.

Finally, the node tracker 116 is an electronic resource that facilitates and manages each of the virtual cloud networks 106 and/or network overlay meshes 108 that are established by the management resource 102. In particular, each computing device that registers as a compute node resource 104 will register with the node tracker 116. The node tracker 116 then continuously (1) tracks all compute node resources 116 on the virtual cloud network 106 and/or each of the network overlay meshes 108, (2) obtains metrics on the computing devices of the compute node resources 104 on the virtual cloud network 106 and/or each of the network overlay meshes 108, and (3) performs speed tests and diagnostics on the networks such as to obtain bandwidth and/or latency metrics for the virtual cloud network 106 and/or each of the network overlay meshes 108. As such, the node tracker 116 maintains connectivity between each of the compute node resources 104 and the management resource 102 on the virtual cloud network 106 and/or each of the network overlay meshes 108, so as to facilitate and maintain data transfer between each of the compute node resources 104 and the management resource 102.

Operation

In operation, the system 100 facilitates distributed computing by one or more of the compute node resources 104 connected to the management resource 102 via the virtual cloud network 106. To begin, a customer user accesses the management resource 102 via the customer portal 110. As used herein, a customer user is a user that requires the distributed computing services of the system 100 to perform one or more tasks. As purely illustrative example, a customer user could include a corporation or a business entity that has a significant amount of data (i.e., "big data") that must be processed. For instance, the customer user may be a marketing firm that has access to a significant amount of consumer data, such as names, ages, addresses, purchasing data, or the like for a large plurality of consumers. If the marketing firm requires significant processing power/time to analyze such consumer data, the marketing firm may use embodiments of the system 100 to perform such processing. It should be understood, however, that the above-provided example was purely exemplary, and embodiments of the present invention can be used for performing computing of any kind.

Once the customer user has accessed the management resource 102, the customer user will be required to register with the management resource 102. If it is the first time the customer user has accessed the management resource 102, the customer user may be required to create (or will be provided with) a customer user account. The customer user can then register for the system 100 to perform one or more distributed computing tasks. The customer can register for the system 100 to perform standard, predefined computing tasks, which may be performed using one or more of the predefined general application containers. Such predefined computing tasks may be tasks that are used generally or repetitively by one or more customer users. As such, the management resource 102 provides for a plurality of general application containers to be stored in the container registry 114 for use by customer users as needed for a particular computing task or tasks. In other instances, the customer can register for the system 100 to perform a unique, customized computing task, which may be a task that is performed by the customized general application containers. Such customized computing tasks may be tasks that are used by few customer users and/or used to perform unique distributed computing tasks.

In certain embodiments, the management resource 102 may provide customer users with a container creation tool that allows customer users to create the customized general and/or accelerated application containers that are required to perform their unique, customized computing tasks. In addition, the container creation tool allows customer users to create base containers, or containers within a base container, or containers, which define one or more PaaS configurations that can be implemented on the virtual cloud network 106. Such a container creation tool may be presented in the form of a user interface that is accessible via the customer portal 110. The container creation tool will allow the customer user to create a customized general application container by compiling the source code of all desired applications, including all of the functions and features and dependencies required for the customized computing task, while ensuring that the container conforms to all requirements for execution via the system 100. For instance, the container creation tool may include a list of a plurality of functions and features from which the customer user can select. In other embodiments, the container creation tool will allow the customer user to simply drag and drop each of the functions and features that will be required for the customer user's customized computing task. In some embodiments, the customer portal 110 will allow customer users to create and deploy to the container registry 114 application containers comprising open source code, or any other source code, which has been custom-rolled (and/or custom-compiled) with specific features or configurations included or excluded, as desired by the customer user. The location of the source code to be compiled and containerized, including all dependencies, will be specified during the container creation process. The source code location is any electronically accessible storage medium, without limitation, where embodiments typically include: a file directory on the customer users workstation, any common file format uploaded by the customer user (such as RPM, tar-ball, Debian packages, etc), or remote source code repositories, such as GitHub, CVS, SVN, or the like, without limitation. Upon selecting the source code, functions and features required for inclusion in the customized, general application container, or accelerated application container, the container creation tool will create the container. Thereafter, the customized, general application container will be transferred to and stored within the container registry 114 until time for deployment to one or more of the compute node resources 104 for purposes of performing the unique, customized computing task. All newly submitted containers, whether created with the container creation tool, or created by any other means, or otherwise uploaded directly to the container registry 114, will be assigned various attributes, such attributes including public or private, depending upon whether the customer user prefers to share or keep private said containers, and other attributes without limitation.

Within the customer portal 110, the customer user may define custom application suites, which are a group of one or more preferred applications. The customer user may also define, if allowed by the management resource 102 administrator, custom platform suites. The custom application suites and custom platform suites are implemented by the use of application suite templates and platform suite templates. For example, when a customer user wishes to deploy one or more containers containing one or more applications onto the virtual cloud network 106, the user may select preferred general application containers from a list available application containers hosted on the container registry 114 and which may be dragged and dropped, or other wise added into an application suite template, which is a list of preferred general applications. Thereafter, the newly created application suite template may be added to a list of application suite templates from where it may be quickly selected and deployed at any time using the customer portal 110. In like exemplary manner, when a customer user wishes to deploy a unique, customized platform, such as a customized PaaS or IaaS, comprised of one or more platform components which are comprised of one or more base containers, the customer user may use the customer portal 110 to select preferred base containers from a list of available base containers hosted on a container registry and which may be dragged and dropped, or other wise added into a platform suite template, which is a list of preferred base containers. Thereafter, the newly created platform suite template may be added to a list of platform suite templates from where it may be quickly selected and deployed at any time using the customer portal 110. Likewise a master quite template may be defined which is a combination of preferred one or more application suite templates combined with one or more platform suite templates. The master suite template may then be stored in a list to be selected during future provisioning of virtual cloud networks 106. The customer user may make additional configurations, which define the relationship between items contained within with the application suite templates and platform suite templates. For instance, containers within an application suite template may be stitched together, allowing or preventing network access between respective containers. Likewise, certain platform suite templates may be configured to allow or disallow the cross-interaction of features between each base container, without limitation. Also likewise, configurations may be made allowing or disallowing certain cross-interactions between the different templates which may be included within the master suite templates, without limitation.

Figure 3:
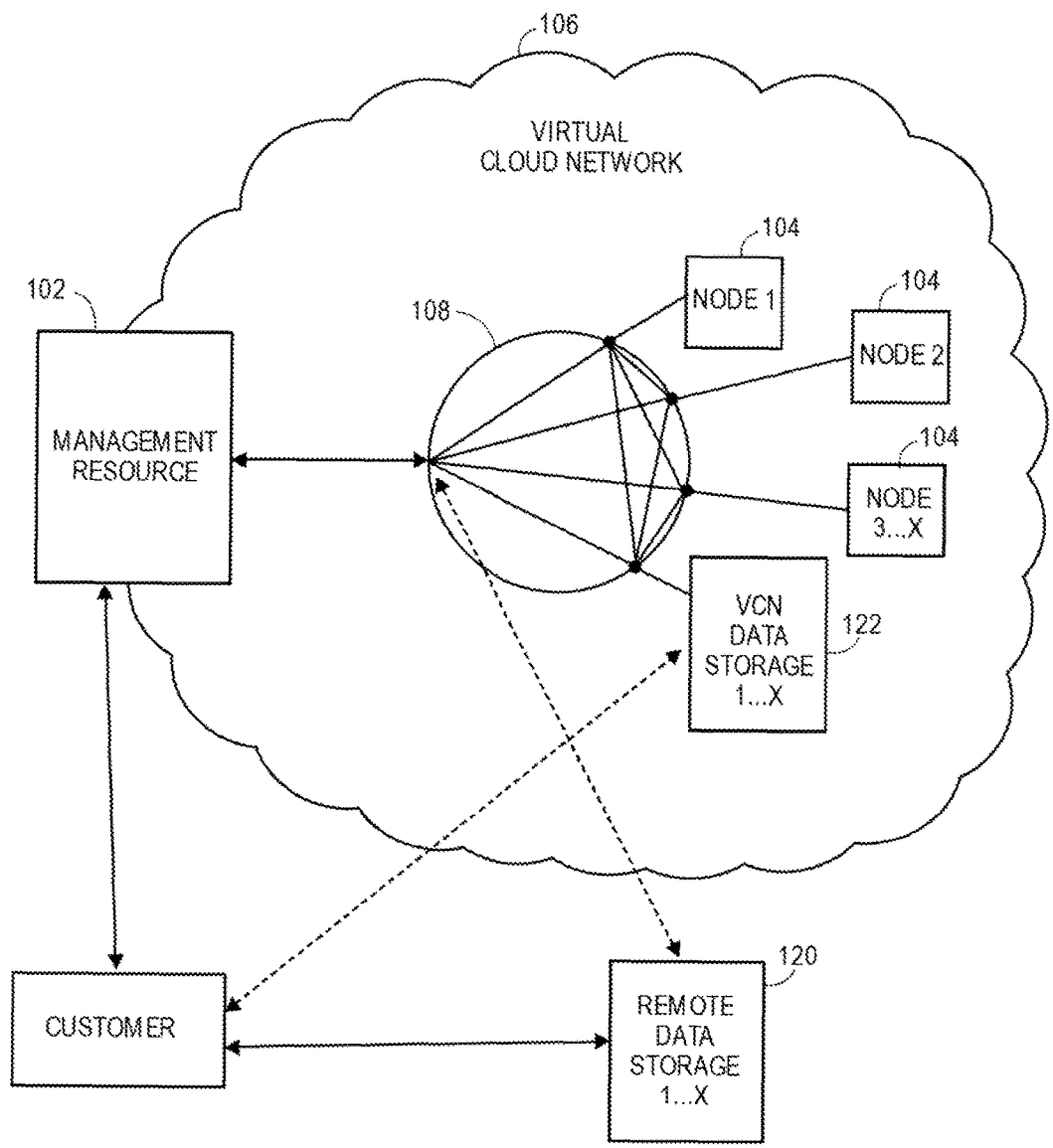
FIG. 3 is yet another schematic depiction of a system for distributed computing according to embodiments of the present invention, with the system illustrating a management resource, data storages, and a plurality of compute node resources connected via a virtual cloud network.

In addition to selecting the appropriate application container to use for performing within the system 100 desired tasks, the customer user will be required to identify, if necessary, a location of task data that is required for the computing task to be performed. In certain embodiments, the task data itself, or a task data uniform resource identifier (URI), can be stored on a data storage element located within and/or associated with the management resource 102. In other embodiments, such as illustrated in FIG. 3, the task data may be stored on one or more remote data storage locations 120, which are located externally from the virtual cloud network 106 and which are accessible by the management resource 102 or by the compute node resources 104 via one or more external networks. In still other embodiments, as is illustrated by FIG. 3, the task data may be stored on one or more virtual cloud network (VCN) data storage locations 122, which are storage locations located within and forming part of the virtual cloud network 106 and which are therefore directly accessible by the management resource 102 or by the compute node resources 104.

Upon the customer user selecting the appropriate application container that is to be used for performing distributed computing tasks, and upon the customer user identifying the location of the task data that is to be used in the computing task (if necessary), the computing task is nearly ready to be performed. First, however, the virtual cloud network 106 must be established with one or more compute node resources 104 upon which to perform the computing for the computing task(s). As previously described, the compute node resources 104 are electronic resources that are executed and run by various types of computing devices that are owned, controlled, and/or operated by users. As used herein, such users will be referred to as participant users. To register their computing device(s), the participant user may, in some embodiments, access the management resource 102, such as through the customer portal or a public website. Upon accessing the management resource 102, the participant user will download and install a client software, which allows the participant user's computing device to register with the management resource 102. It is also understood that the client software may install a hypervisor which hosts one or more operating systems, for one example, a lightweight operating system discussed in more detail below, on which the containers of embodiments of the present invention can be executed and ran. Regardless, such downloading of the client software will generally be required in instances where the participant user is using a personal device, as previously described, for enrolling as a compute node resource 104. In other embodiments, as will be discussed in more detail below, the computing devices of the compute node resources 104 will comprise managed devices, which may be pre-installed with the client software. Regardless, via the client software, the participant user in some embodiments may specify resources of the participant user's computing device that will be made available to the system 100. For example, the participant user can specify what portion of the computing device resources will be made available, such as (1) what portion of the processors (CPUs, ASICs, and/or GPUs), including how many cores or partial cores of the processors, (2) how much processing time, (3) how much RAM, (4) how much hard drive memory (5) how much bandwidth and/or (6) access to other hardware resources on the computing device without limitation (such as sensors, cameras, servo control mechanisms, or any other electronically controllable hardware resources, etc.) will be made available to use for, or within, distributed computing via the system 100. In some embodiments, it is understood that the participant user will allow for all of the computing device resources to be made available at all times. In other embodiments, the participant user may also specify that the computing device resources will be made available for certain time periods (e.g., sometimes-on-sometimes-off) or only when the computing device resources are idle. During idle time, the selected computing device resources will be made fully available to the system 100, whereas when the computing device is in use by a participant user, the computing device resources will be made entirely, or partially unavailable. Partial availability may be specified by the participant user, as a reduced portion of the maximum resources offered to the system 100 when idle. In this way, the system 100 will be allowed to continue utilizing the resources at a reduced level that is acceptable to the participant user. If the reduced portion of computing device resources is less than the compute node resources 104 minimum requirements, the compute node resource 104 may use the opportunity to perform checkpoints, or system state transfers in order to relocate the compute node resource 104 (e.g. a container or virtual machine image) to another compute device on the virtual cloud network. It may be preferable to collect certain computing device 104 metrics for fine-tuning the relocation, execution and operation of application containers. For example, certain container applications that employ distributed computing architectures can make use of real-time metric information to further increase the efficiency of fault tolerance mechanisms within applications that are executing upon the virtual cloud network 106. For one example, embodiments of the present invention may utilize computing device outage histories (such as system crashes, sleep schedules, and non-idle times) to prioritize tasks to be run on the most-available computing devices at the most available time of day, as well as predict, pre-empt and respond to real and potential future outages within the distributed architecture. In one exemplary embodiment, distributed computing tasks which implement let-it-crash fault tolerance (ie. highly fault tolerant) could be deployed onto the historically least-stable systems, whereas computing tasks which are less fault tolerant may be deployed to the most-stable system first.

In certain embodiments, after a participant user downloads the client software and specifies the resources of the participant user's computing device, the client software may download various software components that are executed to setup the compute node resources on the computing device. These software components may often include a virtual machine hypervisor, a lightweight operating system which is booted by the hypervisor and which contains a container system in which one or more of the application containers (e.g., the base containers implementing a PaaS, the virtual switch container, one or more general application containers, and/or accelerated application containers) from the container registry of the management resource 102. As previously mentioned, the base containers may implement a PaaS, which allows the participant user's computing device to act as a compute node resource 104 by allowing the computing device to execute and run one or more of the virtual switch containers and/or general application containers upon one or more lightweight operating systems which run upon one or more hypervisors, or upon bare metal. As such, the execution of the base node containers allows the compute node resources 104 to act as one or more separately network-addressable software applications, including but not limited to, application containers, base containers, operating systems, virtualized or emulated operating systems, or any other software resource executing at any position within a software stack and at any layer of virtualization (or upon bare metal).

Figure 4:
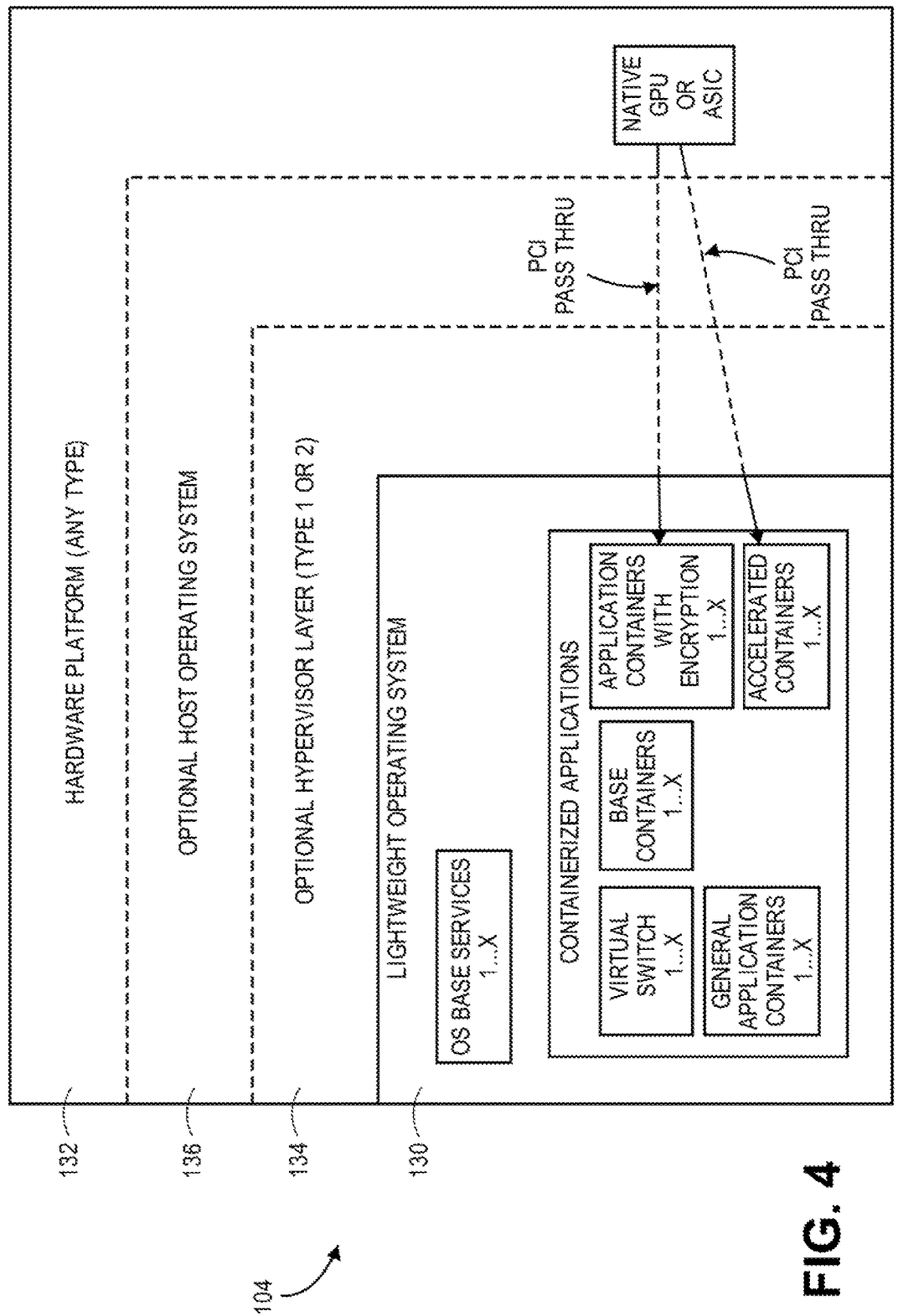
FIG. 4 is a schematic depiction of a compute node resource according to embodiments of the present invention, with the compute node resource having a lightweight operating system for executing and running application containers.

In certain embodiments, as depicted in FIG. 4, the containers of the compute node resource 104 are executed and ran on a lightweight operating system 130 implemented upon a physical, hardware platform 132 (i.e., bare metal) of a computing device. FIG. 4 also depicts optional layers of embodiment, where a hypervisor 134 and/or host operating system 136 may exist between the lightweight operating system 130 and the hardware platform 132. Other potential combinations of software virtualization, emulation and containers may be implemented as additional layers, and are not depicted by FIG. 4. In certain embodiments, the lightweight operating system 130 may be implemented as lightweight POSIX-compliant operating systems containing the minimal services necessary to implement the lightweight operating system 130 and support each of the containers of the system 100. Lightweight operating system 130 services include but are not limited to an Init system (i.e., a Unix-based OS), which provides execution of lightweight operating system 130 services, a distributed configuration management system providing various functions such as network membership consensus, and a container system which supports and executes a plurality of containers.

Figure 5:
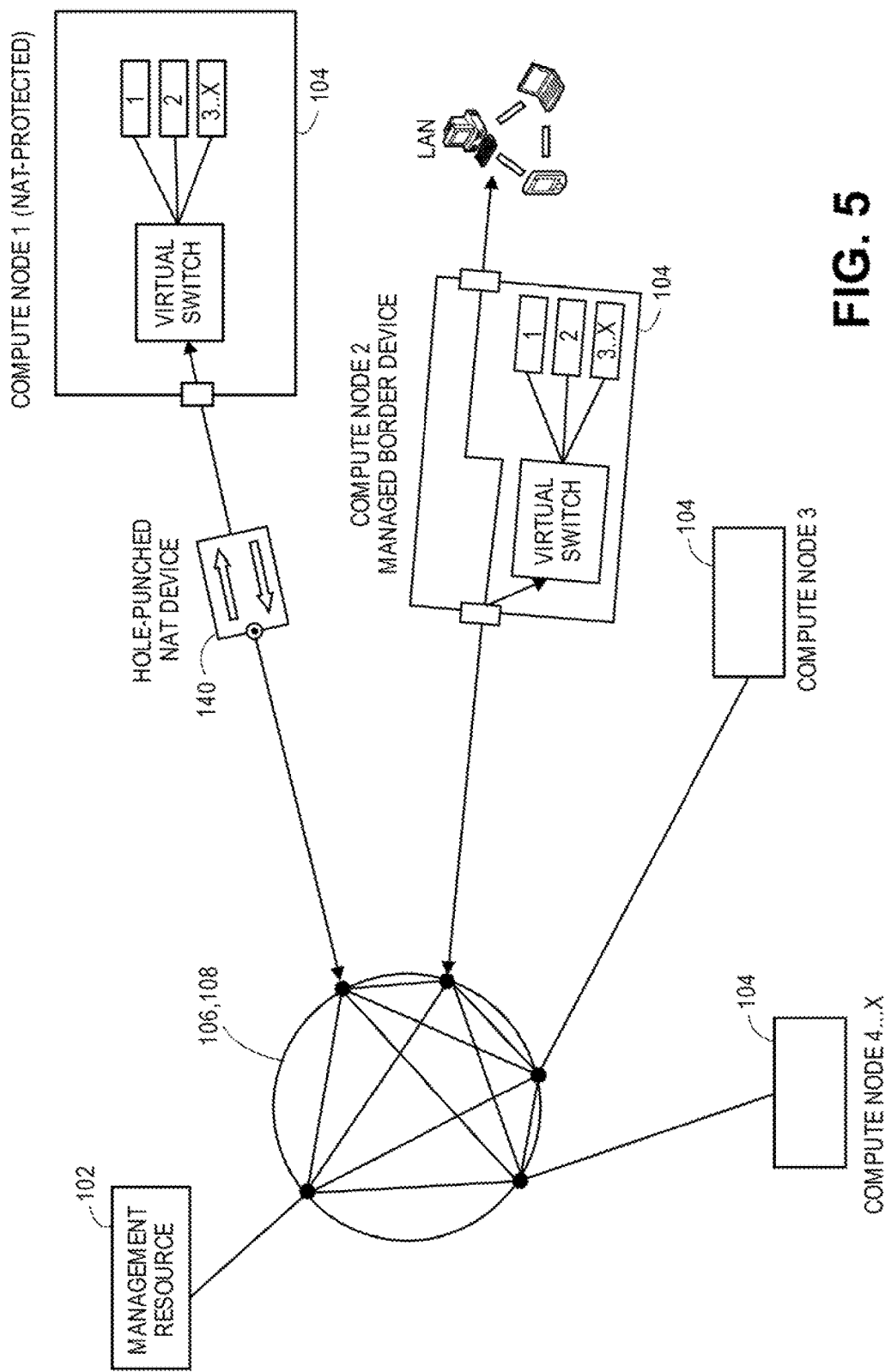
FIG. 5 is a schematic depiction of a particular implementation of the system from FIG. 1, particularly illustrating a first compute node resource being a personal device connected to the virtual cloud network via a hole-punched network address translation device, and further illustrating a second compute node device being a managed device.

As mentioned above, the client software installed by the participant user (or pre-installed in the case of managed devices) may download the software components, as needed including a hypervisor (as necessary), lightweight operating system, base containers, applications containers, virtual switch container, etc. Together, such components will initiate locally on the computing resource and first establish a network connection in order to register the participant user's compute node resource 104 with the node tracker 116 for placement of the participant user's compute node resource 116 within the virtual cloud network 106 and, in certain embodiments, within a particular virtual overlay mesh 108 within the virtual cloud network 106. In certain embodiments, each compute node resource 104 will be assigned an identification (ID) by which the compute node resource 104 can be identified or tracked, such as by the node tracker 114, or by compute node resources 102 on a virtual cloud network 106. Within the compute node resource 104, the virtual switch container manages connectivity with the virtual cloud network 106 and/or network overlay mesh 108. As shown in FIG. 5, a compute node resource 1 is depicted in a common embodiment where the compute node resource is a member of a LAN protected from a WAN by network address translation (NAT) 140. In order to maintain connections directly with the other compute node resources 104 on the virtual cloud network 106 or the network overlay mesh 108, the virtual switch container on each compute node resource coordinates with the node tracker 116 and/or the master node 118 on the management resource 102 in order to implement a plurality of NAT hole-punching techniques. Certain hole-punching techniques may include the use of session traversal utilities for NAT (STUN), traversal using relays around NAT (TURN), Interactive Connectivity Establishment (ICE), or the like. Additional methods, such as universal plug and play (UPnP) may also be utilized to manage NAT traversal, when available.

After registering with the node tracker 116, the compute node resources 104 will periodically report back detailed metrics of the computing device's resources that are currently available for use to the system 100, such as the type and quantity of (1) processor (CPU and/or GPU), (2) processing time, (3) random-access memory, (4) hard-drive memory, (5) geographic location, and/or (6) bandwidth. The node tracker 116 is also configured to perform network speed tests and obtain bandwidth and latency metrics for the system 100, as previously mentioned. It is understood, that the present embodiment significantly benefits from high bandwidth and low latency connections, such as FTTP. However, compute node resources 104 connected to the virtual cloud network 106, and/or a specific overlay mesh 108, with slower connections may be useful in certain embodiments that do not require exceptionally high performance network resources.

In additional embodiments, the computing device metrics will be utilized during provisioning of a virtual cloud network 106 by the management resource 102, such as for setting minimum performance requirements of computing devices when selecting computing devices for the deployment of compute node resources 104 on the virtual cloud network 106. Such computing device metrics are continually gathered from each compute node resource 104 and reported back to the node tracker 116, allowing for an increasingly accurate view of the available resources, performance and stability of each compute node in the virtual cloud network. Other metrics may also be collected, such as up-time, sleep operations, power continuity, system idle state, temperature, user input status and status history, unique participant user identity (ID), and other measurable metrics without limitation. In other embodiments, the compute device metrics may include a location, such as a coordinates obtained from a GPS associated with the computing device or a location obtained from an IP address. Certain metrics are useful for fine-tuning the deployment and execution of certain application containers that may be executed and ran on the virtual cloud network 106 for increased performance of distributed computing tasks, as will be discussed further below.

The node tracker 116 is also configured to provide a list of compute node resources 104 to the management resource 102, including all computing device metrics. When a customer user provisions a virtual cloud network 106, the compute node resources 104 are selected, from the list by the customer user according to whatever desired metric criteria (whether manually selected or selected according to preset criteria), such as will be discussed below. The deployment of a virtual cloud network 106 begins with the provisioning of one or more master node resources 118. The node tracker 116 provides the master node resource 118 with the information necessary to establish direct IPSec tunnels with all compute node resources 104. In some embodiments, the master node resource 118 then communicates all virtual cloud network 106 configuration criteria to the virtual switch containers on each compute node resource 104. The master node resource 118 may also provide a foundation for the implementation of a network overlay mesh 108 between all compute node resources 104, while also playing a mediator role during the negotiation of connections between all members of the mesh 108 where NAT hole-punching, or other techniques, are required to overcome the inability for certain compute node resources 104 to directly negotiate with each other or difficulties in the setup of an encrypted mesh due to separation by NAT. When NAT hole-punching is not possible to implement for a given compute node resource 104, effectively preventing direct interaction with a virtual cloud network 106 or network overlay mesh 118, the compute node resource 104 may yet be provided access to the virtual cloud network 106 or network overlay mesh 118 using the master node resource 118 as the intermediary role providing network access to all other compute node resources 104 on the virtual cloud network 106, whether or not other compute node resources are mesh-enabled.

Once the virtual cloud network 106 has been established with one or more compute node resources 104 each interconnected with each other and one or more master node resource(s) 118 of the management resource 102, the compute node resources 104 are operable to perform the computing tasks. As previously described, the compute node resources 104 may download one or more application containers (e.g., general application container and/or accelerated application containers) for executing and running to perform the computing tasks. In other embodiments, after the participant user has been registered with the management resource 102, the management resource 102 may deploy various application containers to a participant user's compute node resources 104 on demand, as required for specific computing tasks. In more detail, the management resource 102 may, in some embodiments, deploy various application containers to specific compute node resources 104 based on the metrics obtained from the compute node resources 104. For example, if a customer user requests a computing task that requires extremely low latency, the management resource 102 may choose to deploy the application container to those compute node resources 104 connected via broadband (e.g., fiber) and that are each within a 50 mile physical radius from the management resource 102. A customer user or participant user, whatever the case may be, may also implement a virtual cloud network 106 as a zone of trust where only compute node resources 104 which match a specific list of trusted participant user IDs are selected to provision and execute application containers. For instance, participant users may opt to utilize only the compute node resources 104 of their friends on Facebook™, wherever such friends may have installed client software in order to join the system 100. Likewise, in turn, the client software may be configured to offer compute node resources only to selected friends on Facebook™, or other lists of other users as defined by a participant user identity. In other embodiments, the customer user can select attributes that it requires for the compute node resources 104 to have for performing the computing task. As such, the management resource will compare such requirements with the metrics obtained from each compute node resource 104 so as to distribute the container applications only to those compute node resources 104 that satisfy such requirements.

In certain embodiments, the application containers executed by the compute node resources 104 will include all of the information necessary for the compute node resources 104 to complete the associated computing tasks. For example, in instances where the computing task is a web-crawling job, the application container will comprise a self-contained application that includes all necessary instructions and dependencies to instruct the compute node resource 104 to perform the task in isolation. In other embodiments, however, the compute node resources 104 may also require access to task data for competition of the computing task, and involve significant interactions between various nodes within the virtual cloud network 106. For example, if the computing task performed by the compute node resources 104 via execution of the application container comprises manipulation and analysis of a large data set (i.e., task data), then the application container will include the instructions necessary for performing the manipulation and analysis of such task data, including the interaction of nodes across the network overlay mesh. The compute node resources 104 will require access to the task data to be manipulated and analyzed, therefore in some embodiments, the task data will be stored in the data storage located within the virtual cloud network. As previously mentioned, a customer user may provide such data to the data storage location either in a remote data storage location 120 or in a VCN data storage location 122. Regardless of whether the data is stored on the storage location within or outside of the virtual cloud network 106, the application container executed for performing the computing task will include location information (e.g., a uniform resource identifier (URI), and/or an IP address, URL, local or remotely mounted file system, local or remotely accessible database, etc.) for accessing the task data.

Once the application container has been executed and run by the compute node resource 104, and the compute node resource 106 has completed the computing task, any processed data that was resultant from the computing task will be transferred to a data storage location for retrieval by the customer user. In some embodiments, the processed data will be sent to the data storage location from which the original data was obtained (e.g., the remote data storage location 120 or the VCN data storage location 122). In other embodiment, such as for computing tasks that did not require use of any task data, resultant data obtained from the computing tasks will nonetheless be sent to a data storage location as configured within the management resource 102 and/or as specified by the customer user within the application container. Such data storage location may include a remote data storage location 120 or a VCN data storage location 122.

As such, the system 100 described above allows for customer users to have various computing tasks performed via distributed computing by a plurality of compute node resources 104 on a virtual cloud network 106. The plurality of compute node resources 104 can, thus, perform processing-intensive computing tasks in an efficient manner that would not be feasible with one or more standard computing devices connected via standard WAN or LAN-type networks.

In some alternative embodiments, the participant users may have installed third party software which contains the client software to implement membership on the system 100 by downloading such application containers when registering with the management resource 102. The third party software may have been specifically enabled to make use of distributed computing resources of the system 100, for instance, the third party software may be configured by participant user to offer compute node resources 104 to the system 100, while also exploiting the compute node resources of the system 100 when the third party software needs to perform a large computing task. One example of such third party software implementing client software to join the system 100 would include movie rendering software which utilizes the power of compute node resources 104 on external computing devices which also run the movie rendering software. This in effect allows multiple instances of end-user applications installed on participant user computing devices to attain performance increases by borrowing compute node resources 104 from each other.

The description provided above was illustrated by the compute node resources comprising containers to be executed and ran from computing devices such as personal devices, which were computing devices owned and/or operated by participant users who were volunteering and/or offering their computing devices resources for use in the system 100. However, it is understood that embodiments of the present invention contemplate that other computing devices, such as managed devices, may also be implemented as compute node resource 104. For example, certain managed devices may have one or more containers (e.g., virtual switch containers, application containers, and base containers) inherently installed or installable within and operable on the device, such that a participant user is not required to register the computing device with the management resource 102 to allow the device to act as a compute node resource 104 within the virtual cloud network 106. However, such managed devices may be enabled to allow an owner or operator of the devices to disable or enable participation, or define other usage criteria or limitations, of the device as a compute node resource 104 on the virtual cloud network 106.

An example of such a managed device is illustrated as compute node resource 2 depicted in FIG. 5. The managed device may, for example, be a device supplied and/or managed by a third party organization, such as a router, a modem, or a switch that exists on a border of a residential Internet connection. The managed device may provide the base functionality of the router, modem, or switch, such as mediating connectivity between the residential LAN (e.g., Wi-Fi-based network) with the external WAN (e.g., Internet). In addition, however, the managed device contains computational resources and the application containers sufficient to implement itself as a compute node resource 104 on a virtual cloud network 106. Furthermore, the managed device may also implement NAT-traversal functionality, as previously discussed, which allows other compute node resources 104 on the LAN to operate as a member of the virtual cloud network 106 without implementing hole-punching techniques at the LAN-WAN border. The compute node resource 104 may be implemented upon the same computing device resources (RAM, disk, CPU, network device, etc.) that are used to provide the base functionality of the managed device (e.g., router, modem, switch, etc.). The compute node resource 104 may, alternatively, be implemented upon secondary, physically separate or physically integrated computing device resources that are housed inside the enclosure that also houses the hardware which supports the base functionality of the managed device (e.g., the router, modem, switch, etc.). It is understood, however, that the managed device may be any other device in addition to a router, modem, or switch, and may, instead, include any computing device with a processing element and memory elements, as discussed previously. Examples of such devices include, but are not limited to computer workstations, laptops, servers, televisions, DVRs, media boxes, and any other device or hardware upon which compute node resource 104 may be implemented.

Incentivization

Embodiments of the present invention also contemplate that participant users in the virtual cloud network may be remunerated based on their participation in the virtual cloud network 106. For example, participant users that use their personal device type computing devices to perform computing tasks over the virtual cloud network 106 may be provided cash-based incentives, credits, discounts, coupons, or the like. For example, such incentives may be in the form of credits or coupons that can be counted toward free software, services, tangible product rewards, discounts, notoriety, or cash. In other embodiments, the participant users may obtain credits by which the participant users can access the system 100 to have their own computing tasks performed by the compute node resources 104 of the virtual cloud network 106. In other embodiment, for example, OEM manufacturers of certain computing devices may specifically build-in the components necessary for the computing device to act as a compute node resource 104 on the virtual clout network 106. In such instances, the participant users of such computing devices may be incentivized to purchase and/or use the computing device as a compute node resource 104 in a virtual cloud network 106. Such incentives may include the computing device being offered for sale at a subsidized price, or given for free, to participant users who are willing to volunteer their computing device on the virtual cloud network 106. As the computing device performs computing tasks on behalf of customer user, the participant user will receive credits that count toward the subsidization of their computing device. As a particular, exemplary illustration, the computing device could be a video gaming console connected to the Internet. A special incentive could be made available in the gaming console app store, which requests the gaming console's resources to be made available to the virtual cloud network 106. If the participant user agrees to the special incentive, the participant user may receive various incentives, including credits toward free games, or other rewards. As additional examples, such incentives could be arranged as a partnership between video gaming companies, an organization operating the system 100, and/or a broadband service provider (e.g., a FTTP service provider).

Security

Figure 6:
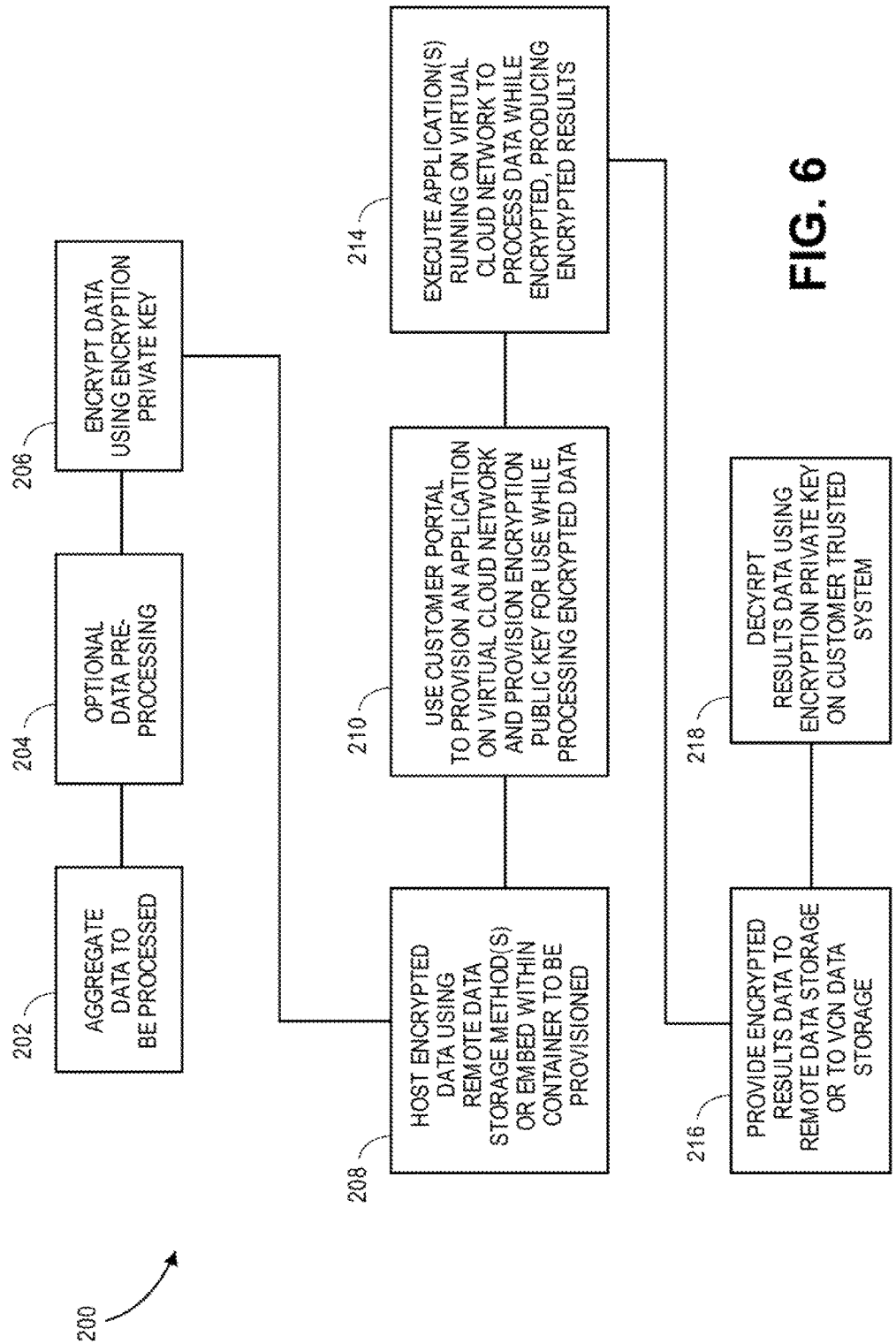
FIG. 6 is a flow-chart of a process for performing distributed computing of encrypted data according to embodiments of the present invention.

Embodiments of the present invention allow for computing tasks to be performed over the virtual cloud network in a comprehensively secure manner. FIG. 6 illustrates a flow diagram of a method 200 which broadly includes the provisioning of application containers that process data while encrypted, the preparation and submission of encrypted data to be processed by the virtual cloud network 106, and the acquisition and decryption of resultant processed data.

To begin the method 200, an initial Step 202 provides for the customer user to aggregate all task data that is to be processed via the virtual cloud network 106 onto a secure data storage location. A secure data storage location should be a trusted data storage location that the customer user selects and deems as having a sufficient implementation of security. As previously discussed, such data storage location may be a remote data storage location 120 or a VCN data storage location 122. In some embodiments, as illustrated in Step 204, the customer user may perform additional processing of the task data, as deemed necessary by the customer user, so as to prepare it for whatever application container will be making use of it on the virtual cloud network 106. In a next step 206, the customer user uses a secure processing encryptor to encrypt the data using an algorithm that enables data to be processed while encrypted. In certain embodiments of the present invention, the secure processing encryptor encrypts the data using a fully or partially homomorphic encryption private key, which results in encrypted data that is processable by the compute node resources 104. The secure processing encryptor also generates a homomorphic encryption public key. Due to the highly resource intensive nature of processing data that has been homomorphically encrypted, embodiments of the present invention include methods that make it feasible to perform such processing.

For example, certain embodiments of the present invention will implement a secure process encryptor which uses homomorphically lightweight encryption algorithms, which require significantly less compute resources than typical homomorphic encryption algorithms, such as those used in military-grade AES-128/256 bit block ciphers. The homomorphically lightweight encryption algorithms are achieved by implementing a lightweight encryption algorithm that is designed to be executed on lightweight hardware having limited compute resources. For example, a plurality of lightweight block ciphers might potentially be implemented as homomorphically lightweight encryption algorithm. In certain embodiments, the homomorphically lightweight encryption algorithm method is implemented with the PRINCE encryption algorithm within the secure processing encryptor to achieve significantly increased performance. In such cases, partial or fully homomorphic encryption may be chosen. Partially homomorphic encryption provides limited mathematical operations, which are therefore computationally less expensive than fully homomorphic encryption. Fully homomorphic encryption can provide additional mathematical operation capabilities, thereby increasing the potential scope and degree to which task data may be processed securely, but at the increased expense of computing device resources (especially hardware processor resources).

Additional embodiments facilitate the feasibility of processing homomorphically encrypted data through the use of selective data encryption, which is achieved by encrypting only those data fields that require confidentiality, resulting in a hybrid securely processable data that is composed of both unencrypted plaintext and securely processable data. Examples of hybrid securely processable data include JSON, XML, CSV, or various database formats, which are selectively encrypted to contain both plaintext and encrypted fields. A significant savings of compute resources will be gained by processing data where only confidential data has been encrypted, while processing all other data in plaintext form.

Furthermore, the feasibility of processing homomorphically encrypted data can be enhanced through the use of the accelerated application containers (typically via GPU or ASIC processors). ASICs as well as GPUs are mathematically suited to perform certain procedures, in this case encryption procedures at significantly greater levels of efficiency. Specifically, GPUs have highly parallel structure which makes them more effective than general-purpose CPUs for carrying out algorithms where processing of large blocks of data is performed in parallel. Similarly, ASICs may be custom-tailored to suit the unique processing needs related to various homomorphic encryption operations.

Given the above, embodiments of the present invention may facilitate the processing of homomorphically encrypted data by combining the processes of 1) using homomorphically lightweight encryption algorithm, such as the PRINCE algorithm, 2) using selective data encryption, and 3) using accelerated application containers (utilizing GPUs or ASICs) to process data while encrypted. As such, present embodiments yield increased efficiency in encrypting, decrypting, and processing data, resulting in an increase of efficiency which is an order of magnitude more efficient than using conventional homomorphic encryption methods without hardware acceleration.

Upon encrypting the data into the securely processable data, in Step 208 the customer user may then make the securely processable data available to the virtual cloud network 106 through a plurality of methods. In certain embodiments, the customer user may submit the securely processable data to a data storage location. As previously discussed, such data storage location may be a remote data storage location 120 or a VCN data storage location 122. In some embodiments, the customer user may, when selecting and/or programming the application container to be processed by the compute node resources 104, include the securely processable data within the application container and/or the accelerated application container, via the customer portal 110. Thereafter, as shown in Step 210, the application container, including the securely processable data, may be submitted to the appropriate compute node resources 104 for distributed computing. As mentioned above, the customer user may also submit the securely processable data as a separate file, via the customer portal, for distribution to the remote data storage location 120 or the VCN data storage location 122 for direct/indirect access by the compute node resources 104. In addition, the public key may be included within application containers that perform Homomorphic processing, or may be submitted (using the customer portal) to a public key registry on the management resource, where it is made remotely accessible to application containers that require the public key to utilize Homomorphic encryption.

After the application containers and/or the accelerated application containers are deployed to the compute node resources 104 on the virtual cloud network, the securely processable data is then accessed by the compute node resources on whatsoever data storage location has been chosen by the customer user to host the securely processable data. As such, the securely processable data is then, as shown in Step 214, processed by the application containers of the compute node resources 104 in encrypted form by incorporation of the public key. Such processing results in encrypted processed data, which is then, in Step 216, sent to whatever data storage location is required by the customer user. Thereafter, the customer can acquire the encrypted processed data from the data storage location and, in Step 218, the encrypted processed data can be decrypted using the private key, which was originally used to encrypt the securely processable data prior to processing on the virtual cloud network.

In addition to the task data being encrypted before and during processing, embodiments of the present invention may also provide for the application containers themselves to be encrypted. Such an encryption of the application containers provides even further layers of protection. In particular, the compiled and non-compiled source code and other information included within the application containers will be encrypted at all times, such that the purpose and/or functionality of the application containers will be secure. As such, the encryption will provide for an encrypted run-time of the application containers, such that when the application containers are being used to process the task data, the execution processes of the application containers will be encrypted and, thus, secure.

It should be understood that the scenario above may be followed to implement processes that either include or exclude the functionality of processing data while encrypted, as also described above. It should also be understood that any computing tasks may be performed using encrypted run-time containers that may otherwise be performed without encrypted runtime containers. As such, embodiments of the present invention are capable of executing encrypted container applications and processing encrypted data, including encrypted executables at rest, encrypted executables in execution, encrypted processed-data at rest, encrypted unprocessed-data at rest, encrypted data in processing, and encrypted data in transit. Thus, embodiments of the present invention achieves end-to-end zero-knowledge encrypt of all virtual cloud network 106 operations and data therein, resulting in complete protection from all threats to data confidentiality throughout the system; complete prevention of all threats to data integrity where an attacker may desire to perform meaningful manipulation of clear-text data and/or application containers which are otherwise encrypted at all times; and preservation of data availability where coherent manipulation of unencrypted attack surfaces is required to discover and exploit vulnerable factors of the targeted node, network, or data in order to disrupt the availability of data.

Independent Virtual Cloud Network

Figure 7:
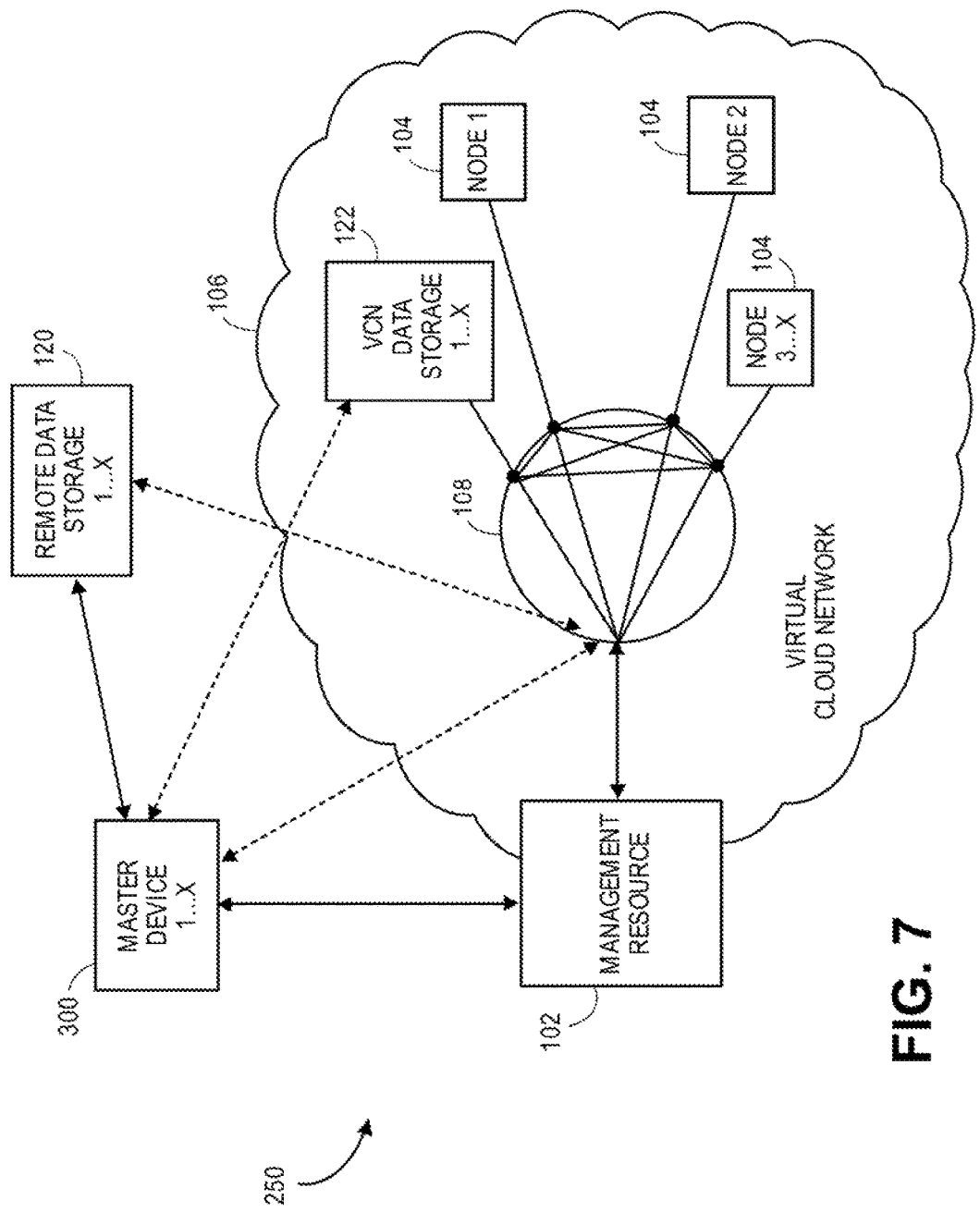
FIG. 7 is still another schematic depiction of a system for distributed computing according to embodiments of the present invention, with the system illustrating a management resource, data storages, a master device, and a plurality of compute node resources connected via a virtual cloud network.
Figure 8:
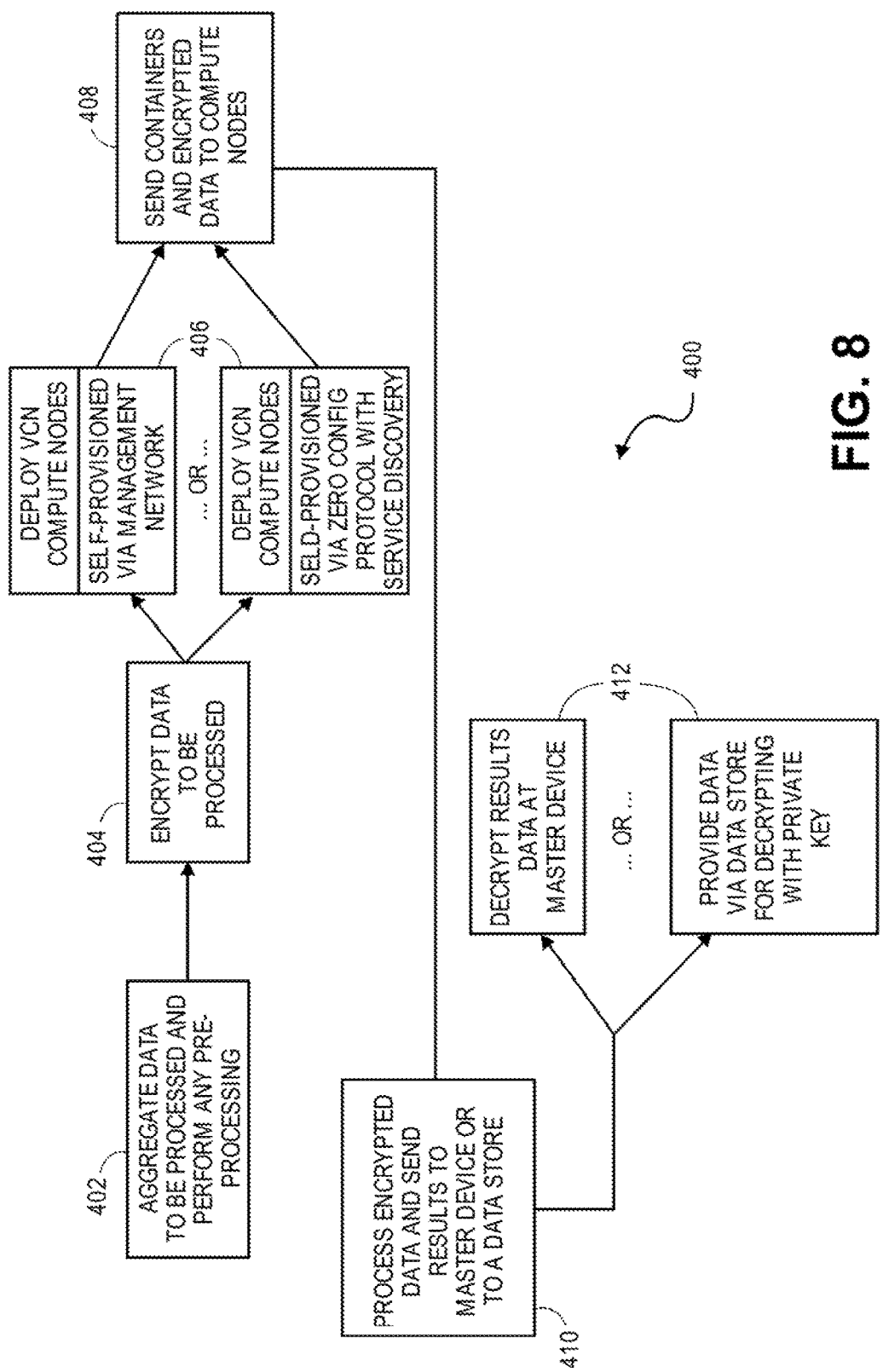
FIG. 8 is a flow-chart of a process for performing distributed computing of encrypted data according to embodiments of the present invention, with the process including the master device from FIG. 7.

In addition to the embodiments detailed above, which include the system 100 having a plurality of compute node resources 104 and a management resource 102 interconnected via a virtual cloud network 106, embodiments provide for a system 250, such as illustrated in FIG. 7, in which distributed computing can be performed without a management resource 102. In particular, a computing device, such as any of the computing devices previously mentioned and/or described, can be used as a master device 300 to establish a virtual cloud network 106 for performing distributed computing via one or more computing device resources. The master device may comprise any type of computing device with processing and memory elements, such as any of the computing devices previously discussed. In more detail of the system 250, in certain embodiments, the master device 300 may not have access to the management resource 102, such as if the master device 300 is not connected to a network that provides access to the management resource 102. Regardless, the master device 300 can establish its own virtual cloud network 106 for performing distributed computing via one or more computing device resources 104.

For example, if the master device 300 is capable of connecting to a plurality of computing devices that are connected via a LAN, the master device 300 can implement a virtual cloud network 106 within the LAN so as to permit the computing devices to act as compute node resources 104 to perform distributed computing. In certain embodiments, the master device 300 will be configured to search for all available networks to which it can connect to form a virtual cloud network 106. If there are multiple available networks, then the master device 300 may select the network based upon whatever preference has been configured by the master device user. In some embodiments, the master device 300 will automatically connect to a particular network based on connection rules. For instance, the connection rules may require that the master device 300 connect only to LANs. Alternatively, the connection rules may require that the master device 300 connect only to LANs, unless no LANs are available, then the master device 300 can connect to any available WAN. Other connection rules my specify an order of preference, such as LAN first, and WAN second, or a first LAN first and a second LAN second and first WAN third, etc. In other embodiments, the master device 300 may collect network metrics from each network that is in range. As such, the master device 300 may include such network metrics in its connection rules. For example, the master device 300 may connect to the available networks and/or compute nodes on said networks which have the strongest signal, the highest bandwidth, the most computing devices, and/or the most computing device resources (e.g., available processors, memory, or other preferred hardware such as sensors, servos, ASICs, cameras, and the like without limitation, etc.), or the master device 300 may connect according to any other metric-based connection rules.

Regardless, as illustrated by method 400, once the master device 300 has selected a network, the master device 300, in Step 402, begins the process of creating a computing task by aggregating any task data that is to be processed. In some embodiments, the task data will be stored on the master device itself in a local memory element. The local memory element may preferably be secure, such that the local memory element includes a trusted data storage mechanism, which has some implementation of security as deemed appropriate by the master device 300 user. In other embodiments, the data will be aggregated onto a data storage location. As previously discussed, such data storage location may be a remote data storage location 120 or a VCN data storage location 122. If the data storage location is a remote data storage location 120, the master device 300 may require that the storage location is nonetheless a trusted data storage mechanism, which has some implementation of security as deemed appropriate by the user of the master device 300. In certain embodiments, additional processing of the data may be performed by the master device, if necessary, to prepare the data for whatever container applications will be processing it on the virtual cloud network.

In Step 404, the master device 300 then uses the secure processing encryptor to encrypt the data using an algorithm that enables data to be processed while encrypted, as was previously discussed. In the present embodiment, the secure processing encryptor encrypts the data using a homomorphic encryption private key, which results in securely processable data and also generates a homomorphic encryption public key. Due to the highly resource intensive nature of processing homomorphically encrypted securely processable data, certain embodiments may utilize the unique methods that efficiently facilitate such homomorphic encryption.

Thereafter, in Step 406, the master device 300 then causes a virtual cloud network 106 to be established either by: (1) accessing the management resource 102 (if available or if applicable) via the customer portal 110 (e.g., web-portal, API, etc.), or (2) self-provisioning a virtual cloud network 106 of compute node resources 104 on any accessible network using a zero configuration protocol with service discovery. Zero configuration protocol may be used to join a network (typically but not necessarily a LAN) and to discover services that are being advertised by potential compute node resources 104 on the network.

Upon provisioning a virtual cloud network, in Step 408, the master device 300 sends the application containers (e.g., general application containers or accelerated application containers) and the securely processable data to the compute node resources 104 for execution and computation. In embodiments in which the securely processable data is maintained on a data storage location external from the master device 300, such data may be obtained from the data storage location. The securely processable data is then processed, in Step 410, resulting in encrypted processed data, which is stored via the application containers onto whatever final data storage location was requested/established by the master device 300. For example, the compute node resources 104 may send the encrypted processed data to the master device 300, or to another data storage location (e.g., remote data storage location 120 or VCN data storage location 122). In Step 412, the encrypted processed data may then be unencrypted at the master device 300 for further incorporation into functions performed locally on the master device 300, or it may be transmitted to destinations outside the master device 400. If the encrypted processed data was sent to an external data storage location (e.g., remote data storage location 120 or VCN data storage location 122), then the encrypted processed data may be retrieved from such external location by the master device 300 user, or by another authorized third-party (to whom the master device 300 may or may not (in the event of foreknowledge of such location by the third-party) communicate such external location details) and then decrypted by use of the corresponding private key. It should be understood that the same scenario above may be followed to submit in a non-encrypted fashion, with a process that specifically lacks the functionality of processing encrypted data.

It is to be understood that while certain forms of the present invention have been illustrated and described herein, it is not to be limited to the specific forms or arrangement of parts described and shown.

The invention claimed is:

1. A computer-implemented method for performing distributed computing in a secure manner, said method comprising the steps of:
    (a) encrypting, via one or more processors, a data set using a homomorphic encryption algorithm;
    (b) generating a plurality of application containers configured to process the encrypted data set encrypted in step (a), wherein the application containers are self-contained applications that comprise all dependencies necessary for execution and operation of the application containers;
    (c) providing, over one or more communications networks, the encrypted data set to a plurality of compute node resources;
    (d) deploying, over the one or more communications networks, the application containers to the compute node resources, wherein the compute node resources are configured to execute the application containers to process the encrypted data set to obtain a processed encrypted data set;
    (e) receiving, over the one or more communications networks, the processed encrypted data set from the compute node resources;
    (f) decrypting, via one or more processors, the processed encrypted data set to obtain a decrypted processed data set;
    (g) managing the compute node resources with a management resource; and
    (h) tracking, via the management resource, metrics associated with each of the compute node resources.

2. The method of claim 1, wherein the homomorphic encryption algorithm is a lightweight encryption algorithm comprising a plurality of lightweight block ciphers.

3. The method of claim 1, wherein during the encrypting of step (a), only a portion of the data set is encrypted.

4. The method of claim 1, wherein the encrypting of step (a) is performed by a graphics processing unit.

5. The method of claim 1, further comprising the step of aggregating task data onto a secure data storage location, wherein the aggregated task data comprises the data set that is encrypted in step (a).

6. The method of claim 5, wherein the secure data storage location is a remote data storage location.

7. The method of claim 5, wherein the secure data storage location is included in the management resource, wherein the management resource is further configured to deploy the application containers to the compute node resources.

8. The method of claim 1, wherein the application containers deployed to the compute node resources include portions of the encrypted data set.

9. The method of claim 1, further comprising the step of encrypting the application containers prior to said deploying of step (d).

10. The method of claim 1, wherein the compute node resources are interconnected via a virtual cloud network.

11. The method of claim 10, wherein each compute node resource is made available via a computing device of a user of the virtual cloud network.

12. The method of claim 11, further including the step of remunerating users for performing computing tasks with the computing devices of the users.

13. The method of claim 12, wherein the remuneration is selected from one or more of: cash-based incentives, credits, discounts, and coupons.

14. The method of claim 10, wherein the virtual cloud network is established by a computing device, wherein the computing device is a master device.

15. The method of claim 14, wherein the master device establishes the virtual cloud network among computing devices from one or more available networks.

16. The method of claim 15, wherein the available networks and/or computing devices are selected by the master device based on one or more connection rules.

17. The method of claim 14, wherein master device is configured to obtain metrics from the virtual cloud network.

18. The method of claim 1, wherein the dependencies comprise one or more of: binaries, libraries, and configurations necessary for execution of the application containers.

19. The method of claim 1, wherein said generating of step (b) includes selecting the application containers used to process the encrypted data set.

20. The method of claim 1, wherein at least one of the compute node resources is implemented as a bitcoin miner.

21. The method of claim 1, wherein the data set comprises task data stored on one or more data storage locations.

22. The method of claim 21, wherein the one or more communications networks comprises a virtual cloud network, and wherein the one or more data storage locations are within the virtual cloud network.

\* \* \* \* \*